Figure 8:
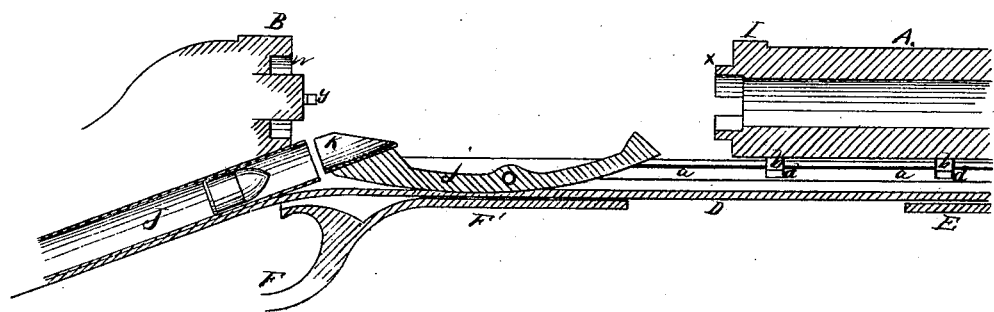

2 Sheets--Sheet 1.
A. SWINGLE & F. A. HUNTINGTON.
Magazine Fire-Arms.
No. 150,102. Patented April 21, 1874.
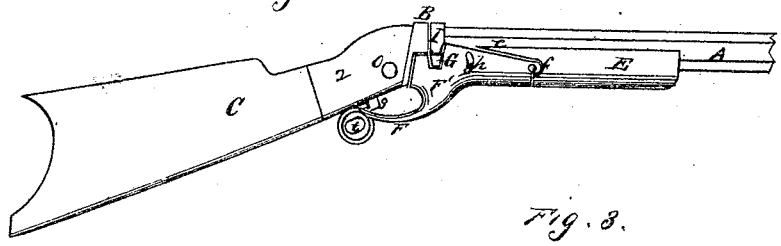
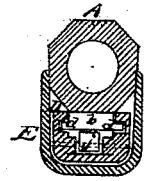
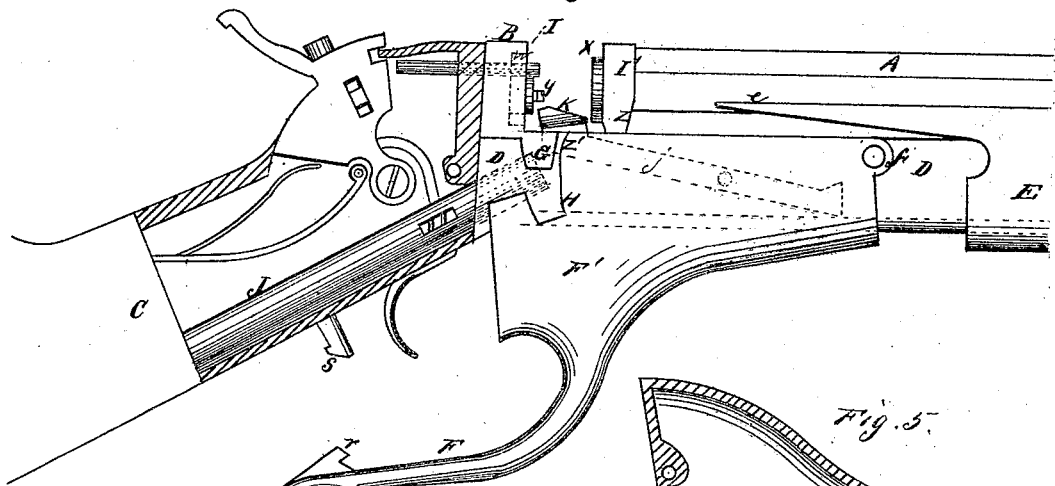
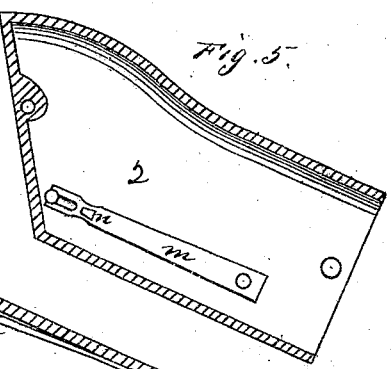
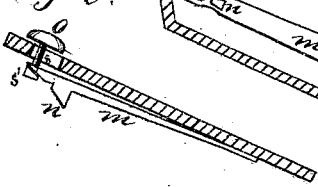
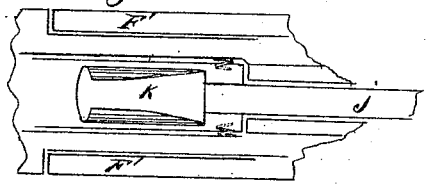
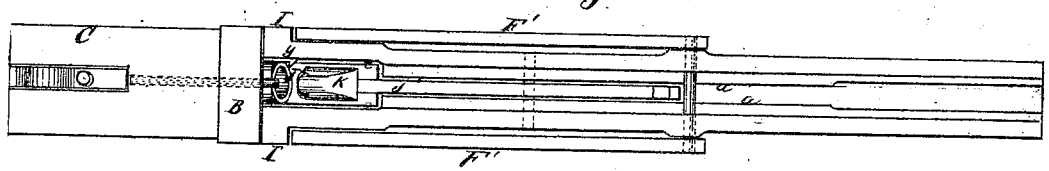
Witnesses
John L. Boone
C. M. Richardson
Alfred Swingle,
Frank A. Huntington
by Dewey & Co.
Attys 2 Sheets--Sheet 2.

A. SWINGLE & F. A. HUNTINGTON.
Magazine Fire-Arms.

No. 150,102. Patented April 21, 1874.

Witnesses

UNITED STATES PATENT OFFICE.

ALFRED SWINGLE AND FRANK A. HUNTINGTON, OF SAN FRANCISCO, CAL.

IMPROVEMENT IN MAGAZINE FIRE-ARMS.

Specification forming part of Letters Patent No. 150,102, dated April 21, 1874; application filed March 11, 1874.

*To all whom it may concern:*

Be it known that we, ALFRED SWINGLE and FRANK A. HUNTINGTON, of the city and county of San Francisco, State of California, have invented Improvements in Fire-Arms; and we do hereby declare the following description and accompanying drawings are sufficient to enable any person skilled in the art or science to which it most nearly appertains to make and use our said invention without further invention or experiment.

Our invention relates to an improved breech-loading fire-arm, which can be either provided with a magazine and used as a repeater, or be loaded by hand, like an ordinary breech-loader. Our invention consists in sundry improvements in detail, more fully hereinafter described and claimed.

Referring to the accompanying drawings for a more complete explanation of our invention, Figure 1, Sheet 1, is a side elevation, with the gun ready for firing. Fig. 2 is a transverse section. Fig. 3 is a side elevation, with the breech opened. Fig. 4 is an enlarged top view, showing the saddle. Figs. 5 and 6 are detached views of the spring *m*. Fig. 7 is a top view of the gun - stock, the barrel being removed. Fig. 8, Sheet 2, is a longitudinal section.

A is the barrel, B, the breech-block, and C the stock, of our gun. The breech-block B has an extension or bed piece, D, extending forward beneath the rear end of the barrel, so as to serve as a support or frame for the barrel to rest and move upon. This bed-piece is made hollow in the form of a U, and longitudinal grooves or ways *a a* are made opposite each other on the inner sides of the U-shaped trough throughout its length. The barrel A has a lug, *b*, formed upon its under side, near the rear end. Side projections *d d* extend outward from each side of this lug. These side projections enter the grooves or ways *a a* at the extremity of the bed-piece D, so that the barrel can be moved back along the bed-piece until the re-enforce or rear end of the barrel strikes the breech-block B, the lug *b* moving in the gutter of the bed-piece. Two lugs may be provided, for the purpose of steadying the sliding movement. A cap, or hollow metallic cover, E, is secured to the under side of the barrel at the proper point to admit the outer end or half of the bed-piece, and serving both as a finish to the gun, and a protection to the slide and ways. The forward end of this cap is closed, with the exception of a hole through which the end of the ramrod passes; while the rear end, for convenience and finish, is formed with a semicircular curve and angular point, *e*. The trigger-guard F and guard-plate F' are made in one piece. The guard-plate is made U-shaped, so as to fit over the bed-piece D in the rear of the cap E. A semicircular projection, *f*, is formed on the forward end of the guard-plate, upon each side of the bed-piece, so as to fit in the semicircular curve of the cap E, and its upper edges are cut angular or beveling, to fit against the angular point *e* of the cap, thus causing the rear portion to clasp the sides of the barrel. A hole is made through the semicircular projections *f* and bed-piece D, through which a screw-bolt passes. Thus it will be seen that the guard and guard-plate form a lever, with the screw-bolt as the fulcrum. A pin and curved slot, *h*, serve to limit the movement of this lever to the desired extent. Upon each side of the extension or bed-piece D, and near its junction with the breech-block, is a square projection, G. The guard-plate has a recess, H, formed in it, which corresponds with this projection, so that when the plate is drawn up closely, the block will fit in the seat or recess. An enlargement, I, on the breech-block serves to match the enlargement or re-enforce on the rear end of the barrel, and give a uniformity of design, but otherwise, as a re-enforce, it is unimportant. The lower corners Z of the enlargement or re-enforce I' on the gun - barrel are beveled toward the rear, while the upper corner or edge Z' of the shoulder formed by the recess on the guard - plate is beveled in an opposite direction. Thus, when the gun-barrel is drawn back against the breech-block, and the guard - plate forced upward against the under side of the bed-piece, the beveled corner of the recess, moving against the beveled corner of the enlargement, forces the barrel closely against the breech-block, and makes a tight joint. The magazine-tube J is placed in the stock of the gun, extending from below the rear end of the barrel in a line to the lower tang of the butt, where it is closed by a screw or by other suitable means. The upper end of the magazine-tube opens into the gutter in the bed-piece below the barrel, as shown. A vibrating lever, $j$, is secured in the gutter of the bed-piece upon a pivot, which passes through it in the manner of trunnions, so that it will rock upon its middle. The rear end of this lever is enlarged, and has a carrier or semicircular clasp-plate, K, secured upon it, so that when the rear end is depressed the carrier will come in line with the magazine-tube, and receive a cartridge from it. This lever is operated automatically by the lug $b$ on the under side of the barrel. As the barrel is pushed forward the lug $b$ rides upon the lever, and depresses its forward end, thus elevating its rear end, so that the cartridge in the carrier will be brought in line with the bore of the barrel. As soon as the carrier rises, the metal block upon which it rests stops the end of the magazine-tube. When the barrel is drawn back the point of the bullet enters the bore of the barrel, and the cartridge is forced out of the carrier at the instant the rear end of the lever is moved down by the lug $b$. We thus provide an automatic loading device which is extremely simple, and easily operated.

In many instances it will be desirable to arrest the cartridges in the magazine-tube, so that the gun may be used as an ordinary hand breech-loader. To provide for this we have made a slot in the magazine-tube near its upper extremity. We then secure one end of a flat spring, $m$, to the inside of the lock-case or plate, which covers the right side of the tube and lock, so that its opposite end will be over the slot.

The spring $m$ has a lug or catch, $n$, which will pass through the slot in the tube, and arrest the passage of the cartridges when the spring is free. The extreme end of the spring is bifurcated, and beveled toward the plate. A button, $o$, on the outside of the plate, which may be corrugated, if desired, has a shank, which passes through a slot in the plate, so that the inner or opposite end of the shank will move between the two separated points of the spring. A head, $s'$, is then provided for the inside end of the shank, so that by moving the button O back or forth with the forefinger of the hand, the head of the shank will, by moving up and down the incline, either open or close the tube, as desired.

This arrangement will be quite useful, as it often happens that hand-loading will answer every purpose, while at any instant the entire magazine will be required.

It will be noticed that the button O is located within easy reach of the forefinger of the hand, even when the gun is sighted, so that no time will be lost in releasing the cartridges in the magazine. Around the breech-pin we make an annular groove, $w$, and upon the rear end of the barrel we form an annular flange, $x$, which enters the annular groove when the barrel is forced back against the breech-piece. This provides a socket-joint, which absolutely prevents leakage of the gas or escape of burnt powder, as in most breech-loaders. The shell-extractor $y$ is secured in the groove $w$, and a small recess is made in the flange in which it fits.

By making the hole $t$ oval, the movement of the finger in operating the lever-guard also latches and unlatches the fastening.

The operation of our improved fire-arm is as follows: The second finger of the right hand is passed through the oval hole in the latch-plate of the guard-ring, while the forefinger commands the trigger and button O. In sighting the gun for firing, the left hand naturally grasps the cap E on the under side of the barrel. In this position it is only necessary to press downward with the second finger of the right hand to unlatch the guard-catch, and a further movement lowers the guard and guard-plate lever until the recess H clears the projection G. This movement of the lever causes the joint at $f$ to move the barrel forward about the sixteenth of an inch. The left hand then pushes the barrel forward until the lug $b$ strikes the transverse bolt which forms the fulcrum of the lever. This movement, as above explained, removes the shell of the discharged cartridge, and brings a fresh cartridge opposite the bore of the barrel, so that when the barrel is forced back the gun is loaded and the carrier forced down opposite the magazine-tube to receive a fresh cartridge. When the barrel is thus forced back, the same operation of the joint at $f$ which first moves the barrel forward about the sixteenth of an inch, also prevents the complete closing of the joint to the same extent, so that there will be no danger of exploding the cartridge by the concussion of drawing the barrel back. The second finger of the right hand then draws the guard and plate lever up to its locking position, causing the inclined faces of the recess H and enlargement on the end of the barrel to draw the parts firmly together and close the joint.

If desired, a self-cocking device may be applied between the guard-plate and cock, so that the final locking movement of the lever F F' will cock the gun. Such an arrangement could be very simply and readily applied; but as quite a strong prejudice exists against self-cocking guns, we have therefore deemed it unimportant to represent such an arrangement in this connection.

We are aware that a breech-loading fire-arm has heretofore been constructed, in which the barrel moved forward to provide a space for loading and removing the shell of the discharged cartridge, by employing the guard as a lever for moving it; but in our gun the guard and guard-plate lever are used only as locking and unlocking devices, while the hand and muscles of the person firing the gun moves the barrel.

Having thus described our invention, what we claim, and desire to secure by Letters Patent, is—

1. The sliding barrel A, having its re-enforce or enlargement I' beveled at Z, in combination with the guard and guard-plate lever F F', with its recess H, having an inclined edge, Z', substantially as and for the purpose above described.

2. The sliding barrel A, with its hollow case or cap E, in combination with the locking-guard and guard-plate lever F F', when the two provide a joint at $f$ by which the initiatory and final closing movement of the barrel against the breech-piece is accomplished, substantially in the manner and for the purpose specified.

3. In combination with the sliding barrel A, with its lug $b$, the vibrating lever $j$, with its carrier or semicircular clasp-ring K, or equivalent device, substantially as and for the purpose above described.

4. The button O, with its shank $s$ and enlargement $s'$, in combination with the spring-catch $m\ n$, slotted magazine-tube J, and lock-plate 2, all arranged and operated as set forth.

In witness whereof we hereunto set our hands and seals.

ALFRED SWINGLE. [L. S.]
FRANK ATWOOD HUNTINGTON. [L. S.]

Witnesses:
JOHN L. BOONE,
C. M. RICHARDSON.